(12) United States Patent
O'Neill

(10) Patent No.: US 7,228,945 B2
(45) Date of Patent: Jun. 12, 2007

(54) TECHNIQUES FOR EMPLOYING ELECTRIC BRAKES TO CONTROL MOVEMENT OF ROTATABLE COMPONENTS

(75) Inventor: Robert John O'Neill, Santa Clarita, CA (US)

(73) Assignee: HR Textron, Inc., Santa Clarita, CA (US)

( * ) Notice: Subject to any disclaimer, the term of this patent is extended or adjusted under 35 U.S.C. 154(b) by 68 days.

(21) Appl. No.: 11/081,437

(22) Filed: Mar. 16, 2005

(65) Prior Publication Data

US 2006/0208565 A1    Sep. 21, 2006

(51) Int. Cl.
*F16D 55/22* (2006.01)

(52) U.S. Cl. .................. 188/72.3; 188/71.5; 303/115.2

(58) Field of Classification Search ...... 188/72.7–73.1, 188/106 A, 106 P, 156, 158, 72.3, 71.5, 73.2; 303/115.2
See application file for complete search history.

(56) References Cited

U.S. PATENT DOCUMENTS

| | | | | | |
|---|---|---|---|---|---|
| 2,413,614 | A | * | 12/1946 | Eksergian | 188/153 A |
| 2,687,786 | A | * | 8/1954 | Kelley | 188/107 |
| 3,482,657 | A | * | 12/1969 | Gunther | 188/71.7 |
| 4,174,025 | A | * | 11/1979 | Ivachev | 188/72.6 |
| 4,175,646 | A | | 11/1979 | Eikelberger | 188/156 |
| 6,581,730 | B1 | * | 6/2003 | Haydon et al. | 188/71.5 |
| 6,702,069 | B2 | * | 3/2004 | Ralea et al. | 188/71.5 |
| 2002/0092710 | A1 | * | 7/2002 | Oppitz et al. | 188/69 |
| 2003/0029680 | A1 | | 2/2003 | Ralea et al. | 188/71.5 |
| 2003/0066719 | A1 | * | 4/2003 | Watanabe et al. | 188/72.7 |
| 2004/0212249 | A1 | * | 10/2004 | Yamaguchi et al. | 303/122.04 |
| 2005/0056499 | A1 | * | 3/2005 | Narcy et al. | 188/71.6 |
| 2005/0115778 | A1 | * | 6/2005 | Chico et al. | 188/72.1 |

OTHER PUBLICATIONS

International Search Report for PCT/US2006/006518, mailed Jun. 20, 2006.

* cited by examiner

*Primary Examiner*—Christopher P. Schwartz
(74) *Attorney, Agent, or Firm*—BainwoodHuang

(57) ABSTRACT

A brake assembly includes a mounting plate, pressure members disposed in a substantially coplanar manner relative to the mounting plate, and electric actuators mounted to the mounting plate. The electric actuators are configured to selectively move the pressure members relative to the mounting plate (i) from a non-braking position to a braking position in response to a first command, and (ii) from the braking position to the non-braking position in response to a second command. Such a brake assembly is well-suited for a variety of applications including vehicle brakes such as aircraft brakes.

20 Claims, 6 Drawing Sheets

TECHNIQUES FOR EMPLOYING ELECTRIC BRAKES TO CONTROL MOVEMENT OF ROTATABLE COMPONENTS

BACKGROUND

An aircraft which uses wheels for taking off and landing typically employs hydraulic brakes to control movement of the wheels, i.e., to stop the wheels from rotating. A typical hydraulic brake for an aircraft includes a hydraulic fluid source, a hydraulic actuator coupled to a wheel, and tubing which connects the hydraulic fluid source to the hydraulic actuator.

To apply the brake, a pilot of the aircraft increases the pressure of the hydraulic fluid from the hydraulic fluid source. As the pressure increases, the hydraulic actuator applies force to a brake element which pushes against the wheel. Friction between the wheel and the brake element (e.g., a pressure puck which is capable of withstanding high temperature) stops the wheel if the wheel is turning, and prevents the wheel from rotating further.

Some conventional hydraulic brakes have a relatively tight design which minimizes pressure loss thus enabling the pilot to maintain hydraulic pressure in the brake system even after power to the aircraft is turned off, and thus maintain application of the hydraulic brakes for several hours. With the ability to maintain brake pressure, the pilot is capable of using the hydraulic brakes as parking brakes to prevent the aircraft from substantially moving (e.g., drifting from a parked location) thus alleviating the need for other parking mechanisms (e.g., wheel blocks, tie downs, etc.) during this period. The use of stored hydraulic pressure for aircraft parking brakes is superior to conventional electric brakes for aircraft which require sustained electric current to hold the brake elements against the wheels and thus continuously consume power while the electric brakes remain on.

SUMMARY

Unfortunately, there are deficiencies in the above-described conventional hydraulic braking system. For example, the hydraulic fluid typically used in hydraulic brakes is extremely flammable thus posing a safety concern. In particular, the temperature generated by the brakes can be excessively high and can easily cause ignition of the hydraulic fluid if that fluid were to inadvertently leak from the hydraulic braking system (e.g., due to a rupture in the tubing).

Additionally, the hydraulic fluid is difficult to clean up. In particular, the hydraulic fluid typically has a low viscosity and is easily soluble. Accordingly, an accidental hydraulic fluid leak typically results in a messy endeavor of first containing the hydraulic fluid in a localized area before it spreads over the surface below, and then removing the hydraulic fluid by applying absorbing material over the hydraulic fluid before the hydraulic fluid has an opportunity to substantially soak or filter into the surface below.

Furthermore, hydraulic brakes typically require high maintenance. In particular, the hydraulic fluid is capable of breaking down and clogging. Accordingly, the hydraulic fluid for critical uses such as in aircraft brakes requires regular and frequent replacement. Also, the brake elements used by the hydraulic aircraft brakes begin to wear down after only a few uses thus requiring a technician to manually re-adjust the positions of the brake elements on a frequent basis.

In contrast to the above-described conventional hydraulic brakes which use hydraulic fluid, embodiments of the invention are directed to techniques for employing electric actuators to provide braking in response to an electronic command. The use of such actuators alleviates the need for hydraulic fluid and hydraulic brakes. Accordingly, the use of electric actuators eliminates flammability concerns over the use of hydraulic fluid, containment and cleaning concerns over hydraulic fluid leaks, and maintenance burdens associated with hydraulic brakes (e.g., there is no hydraulic fluid to replace and a controller configured to issue the electronic command is capable of also being configured to re-calibrate positions of the brake elements thus alleviating the need to manually re-adjust the brake elements).

One embodiment of the invention is directed to a brake assembly which includes a mounting plate, pressure members (e.g., pressure puck brake elements) disposed in a substantially coplanar manner relative to the mounting plate, and electric actuators mounted to the mounting plate. The electric actuators are configured to selectively move the pressure members relative to the mounting plate (i) from a non-braking position to a braking position in response to a first command, and (ii) from the braking position to the non-braking position in response to a second command. Such a brake assembly is well-suited for a variety of applications including wheel brakes for large and small aircraft.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for employing electric actuators to provide robust and reliable braking in response to an electronic command. The use of such actuators alleviates the need for conventional hydraulic brakes and the hydraulic fluid used by those brakes. Accordingly, the use of electric actuators is capable of eliminating flammability concerns over the use of hydraulic fluid, containment and cleaning concerns over hydraulic fluid leaks, and maintenance burdens associated with hydraulic brakes.

Figure 1:
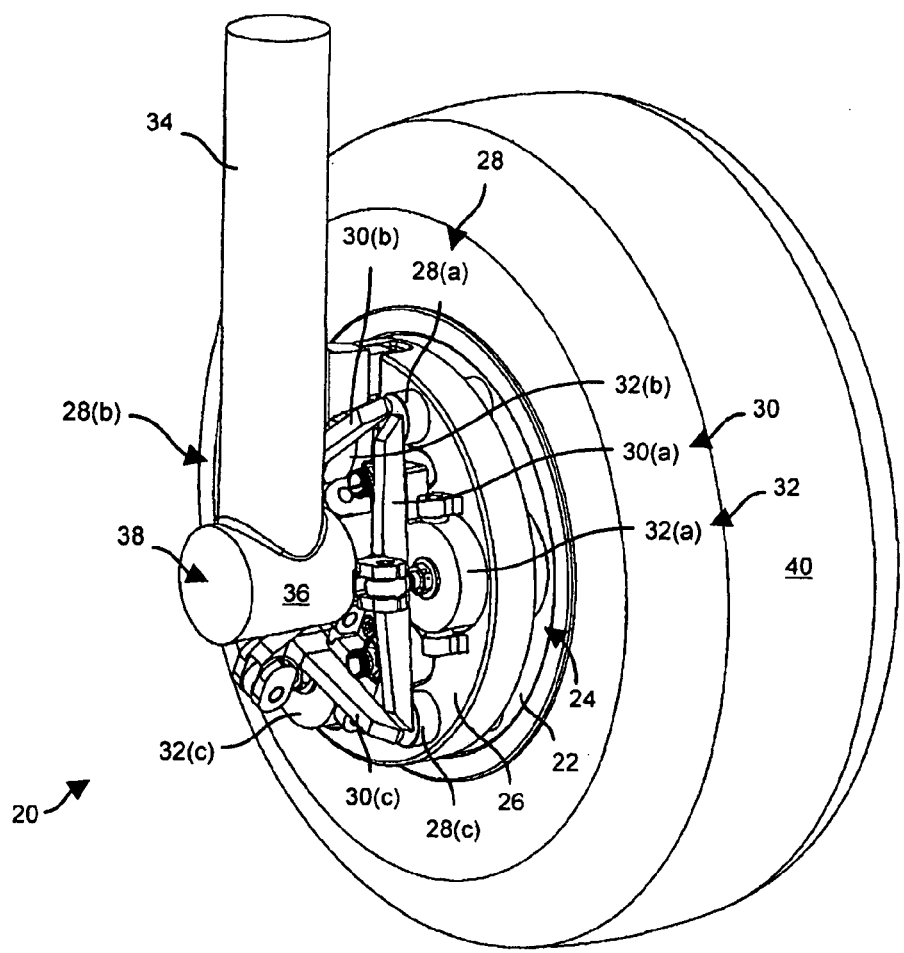
FIG. 1 is a perspective view of a brake assembly which is suitable for use by the invention.

FIG. 1 shows a brake assembly 20 which is suitable for use by the invention. The brake assembly 20 is configured to control movement of a rotatable component 22 which defines a planar braking surface 24 (e.g., a rotor of a wheel). As shown in FIG. 1, the brake assembly 20 includes a mounting plate 26, pressure members 28(a), 28(b), 28(c) (collectively, pressure members 28), linkage elements 30(a), 30(b), 30(c) (collectively, linkage elements 30) and electric actuators 32(a), 32(b), 32(c) (collectively, electric actuators 32).

As shown in FIG. 1, the mounting plate 26 is configured to reside in a fixed position relative to the rotatable component 22, i.e., side-by-side to the rotatable component 22 with the mounting plate 26 and the planar braking surface 24 substantially parallel to each other. Additionally, the pressure members 28 (e.g., pressure puck braking elements) are disposed in a substantially coplanar manner relative to the mounting plate 26. Furthermore, the electric actuators 32 are mounted to the mounting plate 26, and are configured to selectively move the pressure members 28 relative to the mounting plate 26 (i) from a non-braking position to a braking position against the planar braking surface 24 defined by the rotatable component 22 in response to a first command, and (ii) from the braking position to the non-braking position in response to a second command. The pressure members 28 interact with the planar braking surface 24 in substantially even and distributed manner since the pressure members 28 are distributed uniformly about the mounting plate 26.

It should be understood that the brake assembly 20 is well suited for a variety of commercial uses, and that the brake assembly 20 is shown in FIG. 1 in the context of a wheel brake for an aircraft by way of example only. In this context, the mounting plate 26 fastens to a wheel support beam 34. An end 36 of the beam 34 includes an axle 38 (shown generally by the arrow 38). The rotatable component 22 (e.g., a wheel rotor) is configured to rotate around the axle 38, and supports an aircraft tire 40. Further details of the invention will now be provided with reference to FIG. 2.

Figure 2:
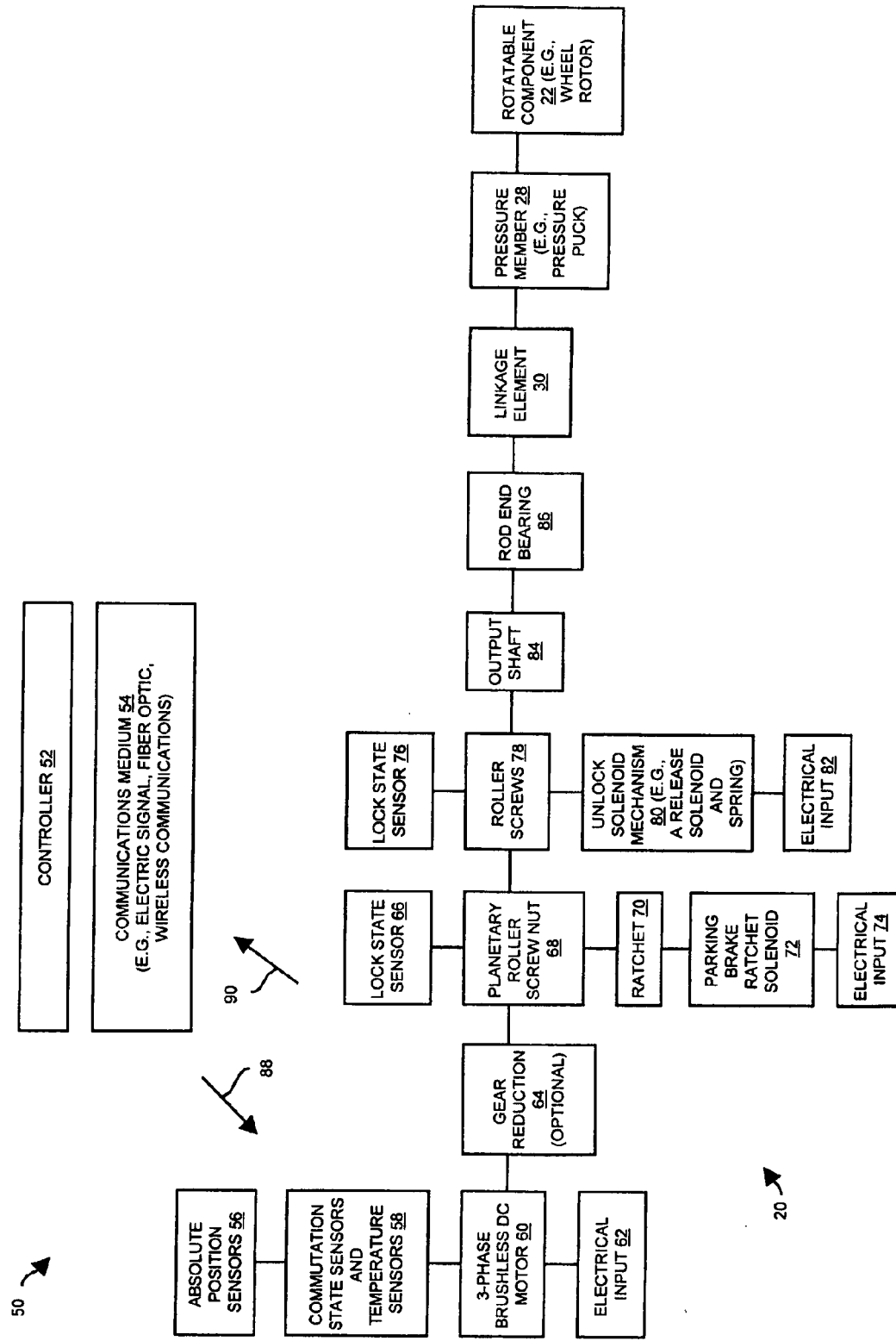
FIG. 2 is a block diagram of a brake system which is suitable for use by the invention.

FIG. 2 is a block diagram of a brake system 50 which is capable of utilizing the brake assembly 20 of FIG. 1. The brake system 50 includes an electronic controller 52 (e.g., a processor and memory, field programmable gate arrays, application specific integrated circuits, analog circuitry, combinations thereof, etc.), a communications medium 54 and the brake assembly 20. The communications medium conveys communications between the controller 52 and the brake assembly 20.

Further details of the brake assembly 20 are provided in block diagram form in FIG. 2. In particular, additional components of the brake assembly 20 are shown, and their interacting relationships with other components when applying a pressure member 28 against the rotatable component 22 are illustrated by connecting lines. As shown, the brake assembly 20 further includes absolute position sensors 56, commutation state sensors and temperature sensors 58, a 3-phase brushless DC motor 60, electrical input 62, optional gear reduction 64, lock state sensors 66, a planetary roller screw nut 68, a ratchet arm (or pawl) 70, a parking brake ratchet solenoid 72, electrical input 74, lock state sensors 76, roller screws 78, unlock solenoid mechanism 80, electrical input 82, an output shaft 84 and a rod end bearing 86. It should be understood that not all of the bearings are shown for simplicity.

During operation, the controller 52 communicates with the brake assembly 20 through the communications medium 54. In particular, the controller 52 sends electronic commands 88 to the brake assembly 20, and receives electronic sensor signals 90 from the brake assembly 20. Such operation is capable of occurring in a control loop, feedback-style manner. Accordingly, a variety of electronic communications forms are suitable for the communications medium 54 including electric signals, fiber optic signals, wireless communications, combinations thereof, and the like. Further details of the brake assembly 20 will now be provided with reference to FIG. 3.

Figure 3:
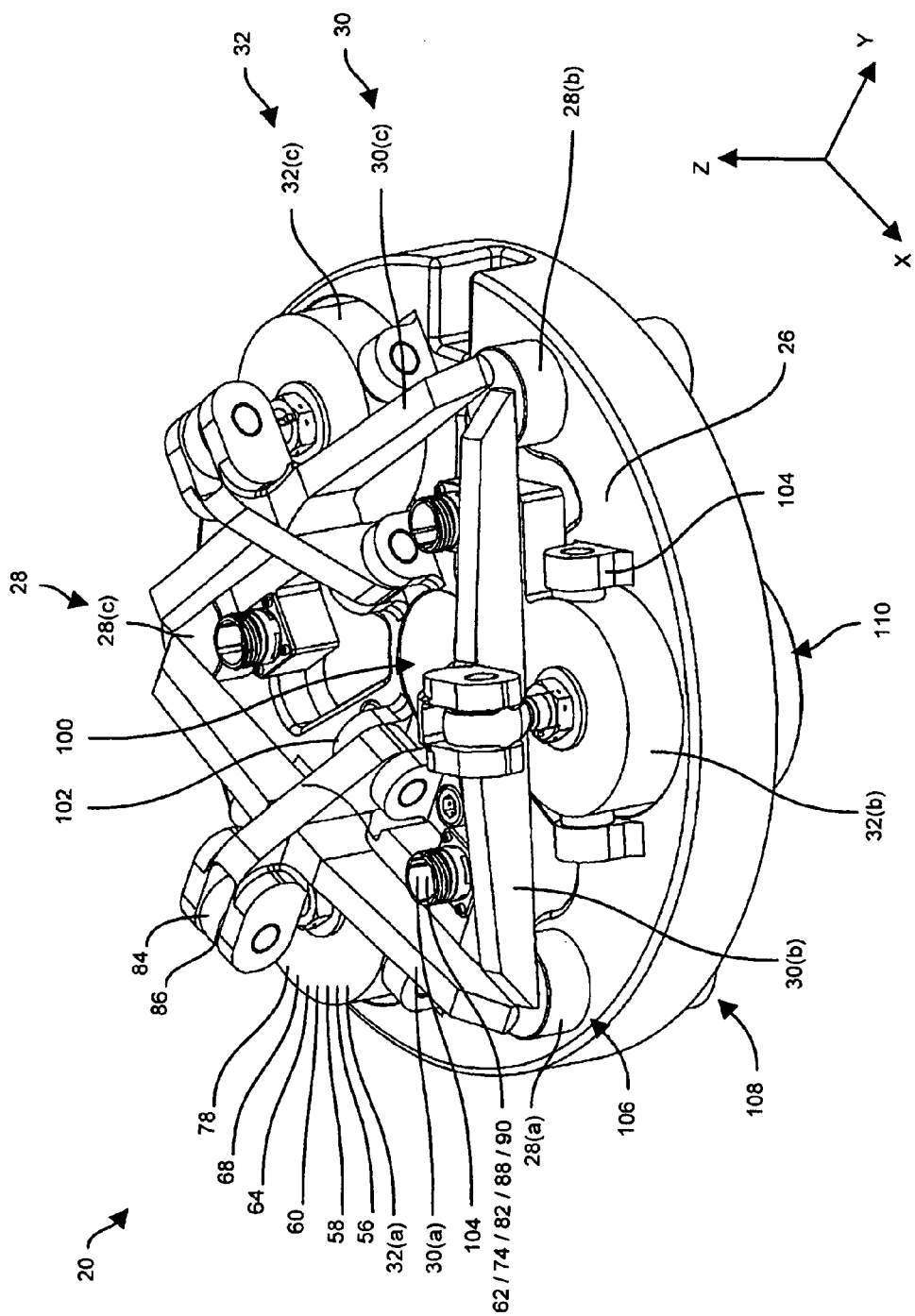
FIG. 3 is a perspective view of a portion of the brake assembly of FIG. 1.

FIG. 3 is a detailed perspective view of the brake assembly 20. The wheel support beam 34, which is configured to attach to the mounting plate 26 (FIG. 1), is omitted from FIG. 3 in order to illustrate other details of the invention. The mounting plate 26 which extends in the X-Y plane, defines a central opening 100 through which the axle 38 is capable of passing (along the Z-axis) in order to connect with the rotatable component 22 (also see FIG. 1). When such connection is made, the planar braking surface 24 defined by the rotatable component 22 extends in the X-Y plane as well and, thus, is substantially parallel to the mounting plate 26. Such a configuration allows the mounting plate 26 to act as a thermal barrier protecting the electric actuators 32 and associated linking mechanisms (e.g., the linkage elements 30, etc.) during braking events which result in high temperatures.

As further shown in FIG. 3, the output shafts 84 of the electric actuators 32 attach to middle portions of the linkage elements 30. The linkage elements 30 then operate as cantilever beams to move the pressure members 28 which are attached to the ends of the linkage elements 30. The mounting plate 26 defines (i) mounting points 102 to which the linkage elements 30 attach and pivot from, and (ii) mounting points 104 to which the electric actuators 32 attach. This arrangement enables the output shafts 84 to provide a slight rocking or cam action on the linkage elements 30 when moving the pressure members 28 relative to the mounting plate 26. The mounting plate 26 further defines (i) holes 106 through which the pressure members 28 pass thus enabling faces 108 of the pressure members 28 to make contact with the planar braking surface 24 of the rotatable component 22 (FIG. 1), and (ii) wells 110 to enable the electric actuators 32 to recess within the mounting plate 26 for a low profile that accommodates a trunnion bearing mounting configuration with the mounting plate 26. The mounting plate 26 further defines connection portions 112 (e.g., electrical connectors) through which various signals pass (e.g., see the electric inputs 62, 74, 82, the commands 88 and the sensor signals 90 of FIG. 2).

It should be understood that many of the components, which are identified in FIG. 2, form part of the electric actuators 32. For example, as illustrated in FIG. 3, the absolute position sensors 56, the commutation state sensors and temperature sensors 58, the 3-phase brushless DC motors 60, the optional gear reduction 64, the planetary roller screw nuts 68, and the roller screws 78 belong to the electric actuators 32.

During operation of the brake assembly 20 and with reference to both FIGS. 2 and 3, the 3-phase brushless DC motors 60 of the electric actuator 32 receive power from the electrical inputs 62. In response to such power, the controller 52 receives sensor signals 90 (see the arrow 90 in FIG. 2) from the absolute position sensors 56, and the commutation state sensors and temperature sensors 58 to determine the current operating conditions of the 3-phase brushless DC motors 60 (e.g., the current angular orientation of the stators, the local temperatures of the motors 60, etc.).

The controller 52 then sends commands to the motors 60 to operate the motors 60. The gear reduction 64 (which is optional) translates movement of the motors 60 into movement of the planetary roller screw nuts 68 and, in turn, the roller screws 78. As will be explained with reference to other figures later, there are a variety of other components which interact with the planetary roller screw nuts 68 and the roller screws 78 to provide parking brake functionality using the brake assembly 20. However, in connection with operating the brake assembly 20 to stop rotation of the rotatable component (e.g., an aircraft wheel rotor), the planetary roller screw nuts 68 translate gear movements from the motors 60 to the roller screws 78. The roller screws 78 then translate that rotation into linear movement of the output shafts 84 along the Z-axis. Accordingly, the planetary roller screw nuts 68 move substantially in tandem with movement of the roller screws 78 and the output shafts 84 which, as will be explained when discussing a parking brake feature of the brake assembly 20, is useful for controlling the operating state of the parking brake.

With further reference to FIGS. 2 and 3, linear movement of the output shafts 84 results in movement of the linkage elements 30 either toward the mounting plate 26 when the output shafts 84 are driven in the negative Z-direction, or away from the mounting plate 26 when the output shafts 84 are driven in the positive Z-direction. As the linkage elements 30 move toward the mounting plate 26, the linkage elements 30 move the pressure members 28 in a substantially perpendicular manner against the planar braking surface 24 defined by the rotatable component 22 (FIG. 1) causing the rotatable component 22 to stop turning.

Accordingly, the brake assembly 20 provides robust and reliable braking operation. In particular, the electric actuators 32 selectively pull the linkage elements 30 toward the mounting plate 26 to force the pressure members 28 into a braking position against the planar braking surface 24 defined by the rotatable component 22 in response to a braking command 88 from the controller 52, or push the linkage elements 30 away from the mounting plate 26 to move the pressure members 28 out of the braking position and into a non-braking position in response to a release command 88 from the controller 52.

It should be understood that there are robust fault tolerant aspects of the brake assembly 20. For example, each linkage element 30 couples a respective electric actuator 32 to a pair of pressure members 28 to distribute the force provided by that electric actuator 30. In particular, the linkage element 30(a) couples the electric actuator 32(a) to the pressure members 28(a), 28(c). Similarly, the linkage element 30(b) couples the electric actuator 32(b) to the pressure members 28(a), 28(b). Furthermore, the linkage element 30(c) couples the electric actuator 32(c) to the pressure members 28(b), 28(c).

Additionally, each pressure member 28 couples to a pair of electric actuators 32 through a pair of respective linkage elements 30 so that each pressure member 28 provides braking force to the rotatable component 22 even if one of the electric actuators 32 fails. That is, if one of the electric actuators 32 or associated linkage element 30 were to fail, the remaining electric actuators 32 and their associated linkage elements 30 would still properly apply force to all of the pressure members 28 for full braking performance by the brake assembly 20. As shown in FIG. 3, the pressure member 28(a) couples to the electric actuators 32(a), 32(b) through linkage elements 30(a), 30(b). Similarly, the pressure member 28(b) couples to the electric actuators 32(b), 32(c) through linkage elements 30(b), 30(c). Also, the pressure member 28(c) couples to the electric actuators 32(a), 32(c) through linkage elements 30(a), 30(c).

Furthermore, it should be understood that the controller 52 is capable of re-calibrating null positions for each pressure member 28 after each braking operation. In particular, the absolute position sensors 56 are capable of reading the position of the motors 60 when the brake assembly 20 is in a full braking position where each pressure member 28 is in maximum contact with the rotatable component 22. Accordingly, when the braking assembly 20 moves to the non-braking position, the controller 52 adjusts the distances of each pressure member 28 from the rotatable component 22 to be the same (i.e., the controller 52 provides each pressure member 28 with the same offset) so that the pressure members 28 stay substantially coplanar with each other and contact the rotatable component 22 substantially simultaneously during the next braking operation. Further details of the invention will now be provided with reference to FIGS. 4 and 5.

Figure 4:
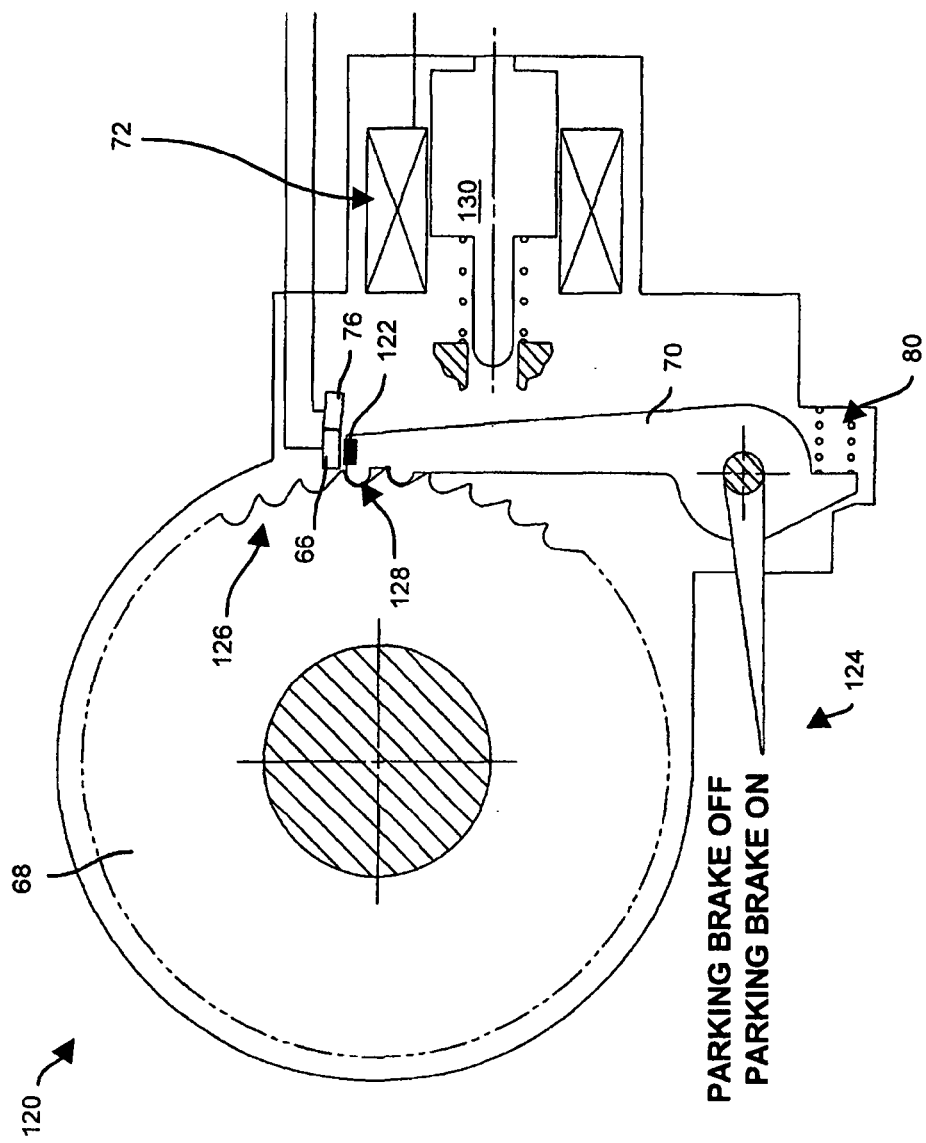
FIG. 4 is a side view of a locking subassembly of the brake assembly of FIG. 1 when the locking subassembly is in a locked state.
Figure 5:
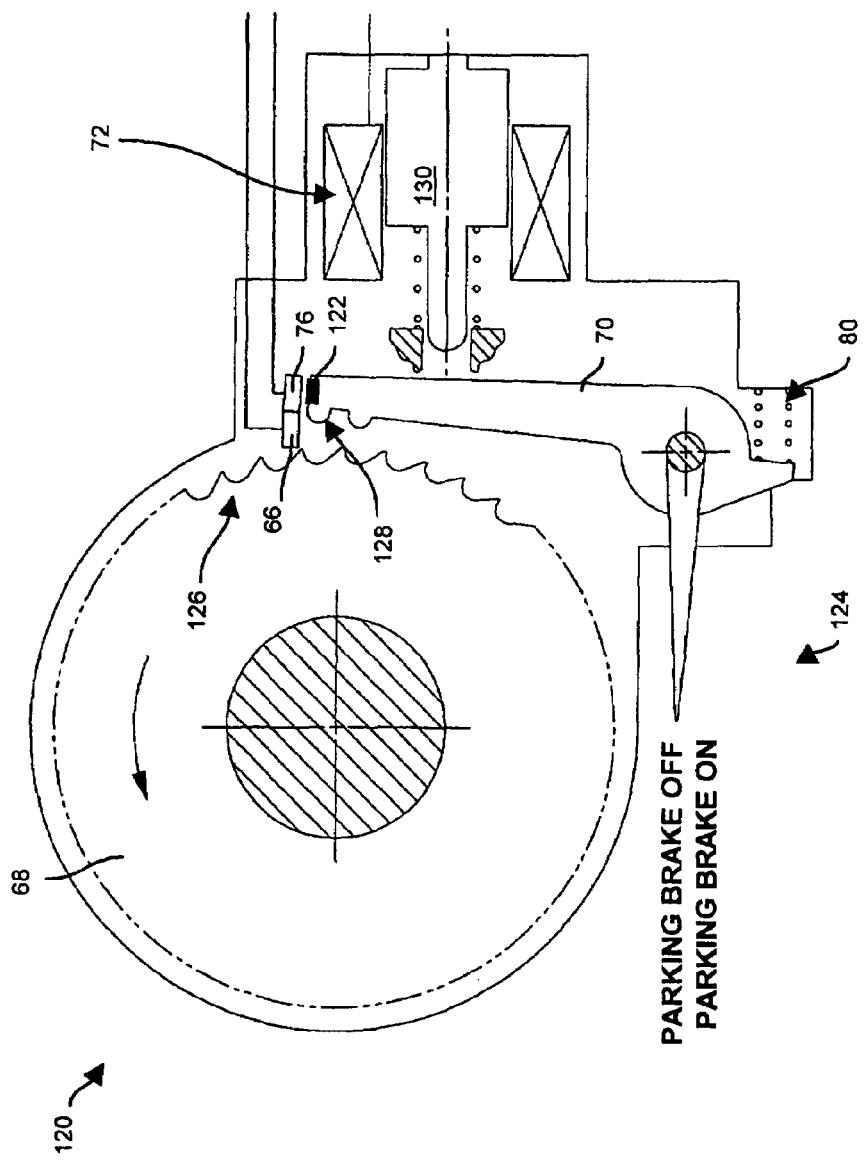
FIG. 5 is a side view of the locking subassembly of FIG. 4 when the locking subassembly is in an unlocked state.

FIGS. 4 and 5 provide side views of a locking subassembly 120 of the brake assembly 20. In particular, FIG. 4 shows the locking subassembly 120 in a locked state, and FIG. 5 shows the locking subassembly 120 in an unlocked state. The locking subassembly 120 resides within an electric actuator 32, and is configured to provide ratchet-type parking brake functionality by exchanging signals 88, 90 with the controller 52 through the communications medium 54 (FIG. 2). In particular, the locking subassembly 120 is configured to selectively transition the planetary roller screw nut 68, the roller screws 78 and the output shaft 84 (also see FIG. 2) between a locked state in which the electric actuator 32 maintains force on the pressure members 28 against the rotatable component 22, and an unlocked state in which the electric actuator 32 does not maintain force on the pressure members 28. As mentioned earlier in connection with FIG. 2, the planetary roller screw nut 68 moves substantially in tandem with movement of the roller screws 78 and the output shaft 84 thus enabling the planetary roller screw nut 68 to control parking brake operation.

As shown in FIGS. 4 and 5, the locking subassembly 120 includes the lock state sensor 66, the ratchet arm 70, the parking brake ratchet solenoid 72, the electrical input 74, the lock state sensor 76, the unlock solenoid mechanism 80, the electrical input 82, magnetic element 122, and an external visual indicator 124. The lock state sensor 66 (e.g., a first Hall sensor) is adjacent the magnetic element 122, and the lock state sensor 76 (e.g., a second Hall sensor) is distal from the magnetic element 122 when the locking subassembly 120 is in the locked state. Similarly, the lock state sensor 76 is adjacent the magnetic element 122, and the lock state sensor 66 is distal from the magnetic element 122 when the locking subassembly 120 is in the unlocked state.

The planetary roller screw nut 68 defines a ratcheted surface 126 which is configured to engage with and disengage from an end 128 of the ratchet arm 70. Although only a portion of the planetary roller screw nut 68 is shown as having the ratcheted surface 126 (i.e., sloped teeth with some of the surface 126 being shown in phantom for simplicity), it should be understood that the ratcheted surface extends completely around the entire planetary roller screw nut 68. Again, the controller 52 provides control commands 88 to operate the various components of the locking subassembly 120, and receives feedback sensor signals 90 to confirm proper operation and to determine future operation. The operation of the locking subassembly 120 will now be explained with reference to FIGS. 2 through 5.

To engage the locking subassembly 120, the controller 52 sends a command 88 to the motor 60 of the electric actuator 32 to momentarily direct the electric actuator 32 (e.g., the actuator 32(b)) to apply force to its respective pressure members 28 (e.g., the pressure members 28(*a*), 28(*b*)). While the electric actuator 32 applies this force, the linkage element 30 (e.g., linkage element 30(*a*)) which couples the output shaft 84 to the pressure members 28 bends slightly due to tension, i.e., recall that the linkage elements 30 operate as cantilever beams and resiliency within the arms of the linkage element 30 store tension. At this point, the controller 52 sends a command 88 (e.g., switch on electric current from the electric input 74 to the solenoid 72, also see FIG. 2) to the parking brake ratchet solenoid 72 causing a piston 128 of the parking brake ratchet solenoid 72 to push the end 128 of the ratchet arm or pawl 70 into engagement with the ratcheted surface 126 of the planetary roller screw nut 68. In response, the end 128 of the ratchet arm 70 rotates toward the ratcheted surface 126 of the planetary roller screw nut 68. The magnetic element 122 moves away from the sensor 76 and adjacent to the sensor 66 thus providing signals 90 identifying the position of the ratchet arm 70 to the controller 52 to confirm proper operation of the locking subassembly 120 thus far.

The controller 52 then sends a command 88 to the motor 60 causing the motor 60 to no longer apply force to its respective pressure members 28, and another command 88 to the parking brake ratchet solenoid 72 (e.g., switch off the electric current from the electric input 74 so that no current reaches the solenoid 72) which releases the piston 130. Accordingly, the ratchet arm 70 now holds the planetary roller screw nut 68, the roller screws 78 and the output shaft 84 in a locked state. Here, tension stored within the linkage element 30 maintains force on the pressure members 28 even when current no longer passes through the solenoid 72, i.e., when the brake assembly 20 is de-energized. Friction between the pressure members 28 and the rotatable component 22 prevents the rotatable component from turning.

Preferably, the linkage element 30 continues to apply force on the pressure members 28 for essentially an indefinite period and the linkage element 30 withstands subtle movements in the components caused by thermal changes following brake operation. That is, stored energy within the linkage element 30 and the combined compliance of the electric actuator 32 and the mounting plate 26 keeps a force applied to the brake. As the brake cools, the compliance acts as a thermal compensator for continued braking.

To disengage the locking subassembly 120, the controller 52 sends another command 88 to the motor 60 of the electric actuator 32 to direct the electric actuator 32 (e.g., the actuator 32(*b*)) to again apply force to its respective pressure members 28 (e.g., the pressure members 28(*a*), 28(*b*)). While the electric actuator 32 applies this force, the controller 52 sends another command 88 to the unlock solenoid mechanism 80 (e.g., a solenoid and spring) which pushes the end 128 of the ratchet arm 70 out of engagement with the ratcheted surface 126 of the planetary roller screw nut 68. In response, the end 128 rotates away from the ratcheted surface 126 of the planetary roller screw nut 68. The magnetic element 122 moves away from the sensor 66 and adjacent to the sensor 76 thus providing signals 90 identifying the position of the ratchet 70 to the controller 52. Such signals 90 enable the controller 52 to confirm that the locking subassembly 120 is now back in the unlocked state. Accordingly, the brake assembly 20 is now capable of operating again in its standard manner. An operator is capable of determining whether the parking brake is "ON" or "OFF" by inspecting the external visual indicator 124. Further details of the invention will now be provided with reference to FIG. 6.

Figure 6:
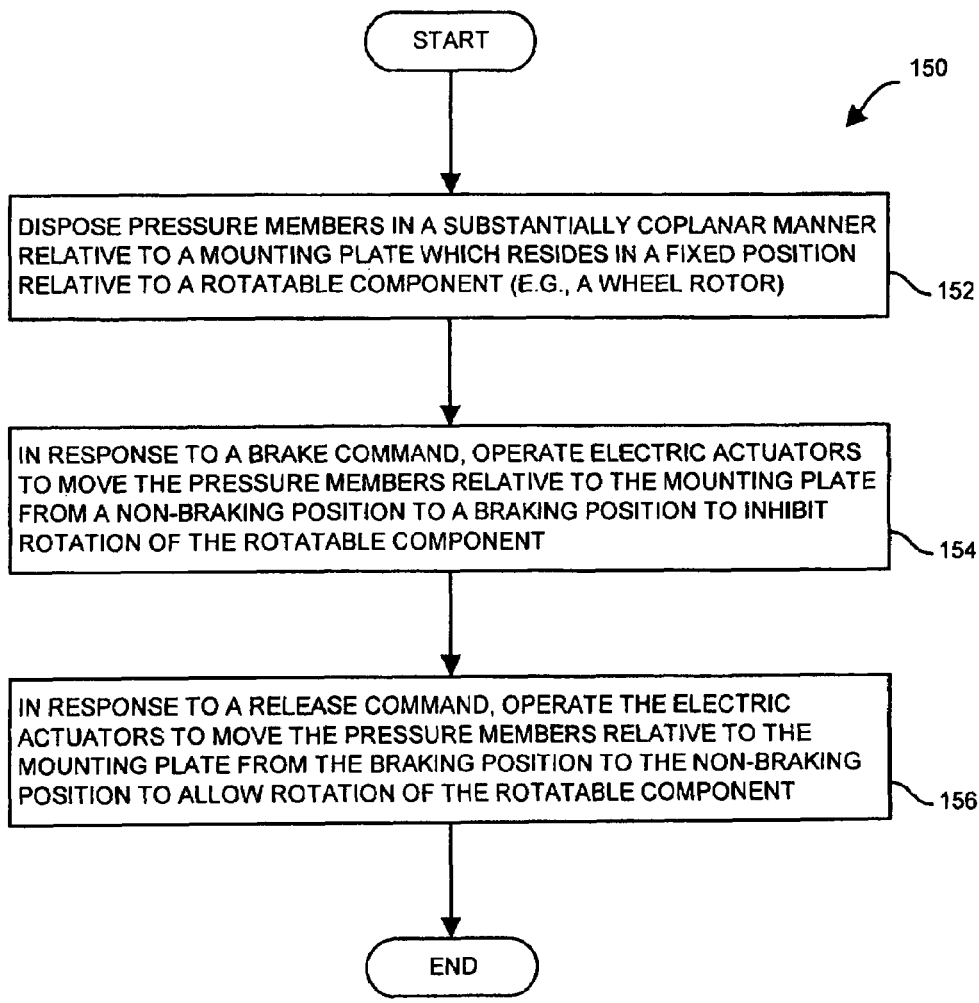
FIG. 6 is a flowchart of a procedure which is performed by the brake system of FIG. 2.

FIG. 6 is a flowchart of a procedure 150 summarizing particular operation of the brake assembly 20. In step 152, the brake assembly 20 disposes the pressure members 28 in a substantially coplanar manner relative to a mounting plate 26 which resides in a fixed position relative to the rotatable component 22. If step 152 is not an initial operation, the controller 52 receives sensor signals 90 from sensors 56 within the brake assembly 20 from a previous brake operation and sends new commands 88 to the electric actuators 32 to re-position the pressure members 28 in their null positions so that all of the pressure members 28 are disposed from the planar braking surface 24 by the substantially same distance.

In step 154, in response to a brake command 88 from the controller 52, the electric actuators 32 move the pressure members 28 relative to the mounting plate 26 from a non-braking position to a braking position to inhibit rotation of the rotatable component 22. In particular, the electric actuators 32 pull the linkage elements 30 toward the mounting plate 26 and thus apply force on the pressure members 28 against the rotatable component 22 to stop the rotatable component 22 from turning.

In step 156, in response to a release command 88 from the controller 52, the electric actuators 32 move the pressure members 28 relative to the mounting plate 26 from the braking position to the non-braking position to allow rotation of the rotatable component 22. In particular, the electric actuators 32 push the linkage elements 30 away from the mounting plate 26 and thus allowing the rotatable component 22 to turn.

The procedure 150 is repeatable for robust and reliable electric braking operation. Little or no manual adjustments are needed for the pressure members 28 in view of the automated re-positioning feature. Moreover, the parking brake operation of the locking assembly 120 can easily take place, e.g., between steps 154 and 156, for enhanced electric braking functionality.

As mentioned above, embodiments of the invention are directed to techniques for employing electric actuators 32 to provide robust and reliable braking in response to electronic commands 88. The use of such actuators 32 alleviates the need for conventional hydraulic brakes and the hydraulic fluid used by those brakes. Accordingly, the use of electric actuators 32 is capable of eliminating flammability concerns over the use of hydraulic fluid, containment and cleaning concerns over hydraulic fluid leaks, and maintenance burdens associated with hydraulic brakes (e.g., there is no hydraulic fluid to replace and a controller configured to issue the electronic command is capable of also being configured to re-calibrate positions of the brake elements thus alleviating the need to manually re-adjust the brake elements).

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the brake assembly 20 is well suited for a variety of commercial uses and that the brake assembly 20 is shown in FIG. 1 in the context of a wheel brake for an aircraft by way of example only. The brake assembly 20 has applications in large and small aircraft wheel brakes, parking brakes, and other dynamic friction braking elements. This includes both fixed wing and rotary wing aircraft wheel brakes. Other suitable uses include ground vehicles (e.g., wheel brakes and parking brakes), the main rotor blade brake for helicopters, and the like.

Additionally, it should be understood that the brake assembly 20 was described above as including three pressure members 28 by way of example only. In other arrangements, there a number of pressure members 28 other than three is used (e.g., two, four, five, six, seven, etc.). Smoother and more uniform operation is achieved with a larger number of pressure members 28.

Furthermore, it should be understood that the locking subassembly 120 is included in at least one electric actuator to provide the above-described parking brake operation. In one arrangement, the locking subassembly 120 is included in exactly one electric actuator 32 of each brake assembly 20 to minimize complexity and costs. In another arrangement, all of the electric actuators 32 of each brake assembly 20 include the locking subassembly 120 for improved reliability and fault tolerance.

What is claimed is:

1. A brake system to control movement of a rotatable component, the brake system comprising:
a controller;
a brake assembly;
a communications medium which conveys communications between the controller and the brake assembly, the brake assembly including:
a mounting plate configured to reside in a fixed position relative to the rotatable component,
pressure members disposed in a substantially coplanar manner relative to the mounting plate, and
electric actuators mounted to the mounting plate, the electric actuators being configured to selectively move the pressure members relative to the mounting plate (i) from a non-braking position to a braking position in response to a first command received from the controller through the communications medium, and (ii) from the braking position to the non-braking position in response to a second command received from the controller through the communications medium,
wherein the rotatable component defines a planar braking surface,
wherein the electric actuators are configured to move the pressure members linearly (i) in a first direction toward the planar braking surface in response to the first command, and (ii) in a second direction away from the planar braking surface in response to the second command, and
wherein the first and second directions are substantially perpendicular to the planar braking surface; and
linkage elements which couple the electric actuators to the pressure members, the electric actuators being configured to (i) pull the linkage elements toward the mounting plate when moving the pressure members in the first direction toward the planar braking surface, and (ii) push the linkage elements away from the mounting plate when moving the pressure members in the second direction away from the planar braking surface.

2. The brake system of claim 1 wherein each linkage element couples a respective electric actuator to a pair of pressure members.

3. The brake system of claim 1 wherein each pressure member is coupled to a pair of electric actuators through a pair of respective linkage elements.

4. The brake system of claim 1 wherein an electric actuator includes:
a shaft which is configured to move a set of pressure members selectively in the first and second directions; and
a locking subassembly which is configured to selectively transition the shaft between a locked state and an unlocked state when the mounting plate resides in the fixed position relative to the rotatable component defining the planar braking surface, the locking subassembly being configured to maintain tension on a linkage element which couples the shaft to the set of the pressure members when the shaft is in the locked state to maintain friction between the set of the pressure members and the planar braking surface defined by the rotatable component even when no electric current passes through the electric actuator, the linkage element being free of that tension when the shaft is in the unlocked state.

5. The brake system of claim 1 wherein the first and second commands are electric control signals from the controller, and wherein the brake system further comprises:
sensors coupled to the mounting plate, the sensors being configured to provide electric sensor signals to the controller through the communications medium to enable the controller to recalibrate null positions for the pressure members after positioning the pressure members in the braking position.

6. The brake system of claim 1 wherein each of the linkage elements includes:
an elongated cantilever beam member having (i) a first end adjacent to a first pressure member, (ii) a second end adjacent to a second pressure member, and (iii) a mid portion disposed between the first and second ends and coupled to one of the electric actuators.

7. A brake assembly, comprising:
a mounting plate;
pressure members disposed in a substantially coplanar manner relative to the mounting plate;
electric actuators mounted to the mounting plate, the electric actuators being configured to selectively move the pressure members relative to the mounting plate (i) from a non-braking position to a braking position in response to a first command, and (ii) from the braking position to the non-braking position in response to a second command, wherein the mounting plate is configured to reside in a fixed position relative to a rotatable component defining a planar braking surface, wherein the electric actuators are configured to move the pressure members linearly (i) in a first direction toward the planar braking surface in response to the first command, and (ii) in a second direction away from the planar braking surface in response to the second command, and wherein the first and second directions are substantially perpendicular to the planar braking surface; and
linkage elements which couple the electric actuators to the pressure members, the electric actuators being configured to (i) pull the linkage elements toward the mounting plate when moving the pressure members in the first direction toward the planar braking surface, and (ii) push the linkage elements away from the mounting plate when moving the pressure members in the second direction away from the planar braking surface.

8. The brake assembly of claim 7 wherein each linkage element couples a respective electric actuator to a pair of pressure members.

9. The brake assembly of claim 7 wherein each pressure member is coupled to a pair of electric actuators through a pair of respective linkage elements.

10. The brake assembly of claim 7 wherein each electric actuator includes a shaft and a locking subassembly; and wherein, for each electric actuator:

the shaft is configured to move a set of pressure members selectively in the first and second directions; and the locking subassembly is configured to selectively transition the shaft between a locked state and an unlocked state when the mounting plate resides in the fixed position relative to the rotatable component defining the planar braking surface, the locking subassembly being configured to maintain tension in a linkage element which couples the shaft to the set of pressure members when the shaft is in the locked state to maintain friction between the pressure member and the planar braking surface defined by the rotatable component even when no electric current passes through the electric actuator, the linkage element being free of that tension when the shaft is in the unlocked state.

11. The brake assembly of claim 7 wherein each of the linkage elements includes:

an elongated cantilever beam member having (i) a first end adjacent to a first pressure member, (ii) a second end adjacent to a second pressure member, and (iii) a mid portion disposed between the first and second ends and coupled to one of the electric actuators.

12. A brake assembly, comprising:

a mounting plate;

pressure members disposed in a substantially coplanar manner relative to the mounting plate; and electric actuators mounted to the mounting plate, the electric actuators being configured to selectively move the pressure members relative to the mounting plate (i) from a non-braking position to a braking position in response to a first command, and (ii) from the braking position to the non-braking position in response to a second command;

wherein the mounting plate is configured to reside in a fixed position relative to a rotatable component defining a planar braking surface;

wherein the electric actuators are configured to move the pressure members linearly (i) in a first direction toward the planar braking surface in response to the first command, and (ii) in a second direction away from the planar braking surface in response to the second command;

wherein the first and second directions are substantially perpendicular to the planar braking surface; and wherein an electric actuator includes:

a shaft which is configured to move a set of the pressure members selectively in the first and second directions; and a locking subassembly which is configured to selectively transition the shaft between a locked state and an unlocked state when the mounting plate resides in the fixed position relative to the rotatable component defining the planar braking surface, the locking subassembly being configured to maintain tension on a linkage element which couples the shaft to the set of the pressure members when the shaft is in the locked state to maintain friction between the set of the pressure members and the planar braking surface defined by the rotatable component even when no electric current passes through the electric actuator, the linkage element being free of that tension when the shaft is in the unlocked state.

13. The brake assembly of claim 12 wherein the locking subassembly of the electric actuator includes:

a roller defining a ratcheted surface, the roller being configured to move substantially in tandem with movement of the shaft; and a ratchet arm which is configured to pivot between a locked position in which the ratchet arm engages the ratcheted surface defined by the roller to place the shaft in the locked state, and an unlocked position in which the ratchet arm disengages from the ratcheted surface defined by the roller to place the shaft in the unlocked state.

14. The brake assembly of claim 13 wherein the locking subassembly further includes:

a spring which is configured to provide biasing force on the ratchet arm to bias the ratchet arm away from the locked position to the unlocked position; and a solenoid which is configured to provide locking force on the ratchet arm which overcomes the biasing force and moves the ratchet arm away from the unlocked position to the locked position.

15. The brake assembly of claim 13 wherein the locking subassembly further includes:

a magnetic element attached to the ratchet arm;

a first Hall sensor disposed at a first location which is adjacent to the magnetic element when the ratchet arm is in the locked position and a distal from the magnetic element when the ratchet arm is in the unlocked position; and a second Hall sensor disposed at a second location which is distal from the magnetic element when the ratchet arm is in the locked position and adjacent to the magnetic element when the ratchet arm is in the unlocked position.

16. The brake assembly of claim 12 wherein each of the linkage elements includes:

an elongated cantilever beam member having (i) a first end adjacent to a first pressure member, (ii) a second end adjacent to a second pressure member, and (iii) a mid portion disposed between the first and second ends and coupled to one of the electric actuators.

17. A method for controlling movement of a rotatable component, the method comprising:

disposing pressure members in a substantially coplanar manner relative to a mounting plate which resides in a fixed position relative to the rotatable component;

in response to a first command, operating electric actuators to move the pressure members relative to the mounting plate from a non-braking position to a braking position to inhibit rotation of the rotatable component; and in response to a second command, operating the electric actuators to move the pressure members relative to the mounting plate from the braking position to the non-braking position to allow rotation of the rotatable component;

wherein an electric actuator includes a shaft which is configured to move a set of the pressure members selectively toward and away from the rotatable component; and wherein the method further comprises:

transitioning the shaft between a locked state and an unlocked state, the electric actuator being configured to maintain tension on a linkage element which couples the shaft to the set of the pressure members when the shaft is in the locked state to maintain friction between the set of the pressure members and the rotatable component even when no electric current passes through the electric actuator, the linkage element being free of that tension when the shaft is in the unlocked state.

18. The method of claim 17 wherein the linkage element includes:
   an elongated cantilever beam member having (i) a first end adjacent to a first pressure member, (ii) a second end adjacent to a second pressure member, and (iii) a mid portion disposed between the first and second ends and coupled to one of the electric actuators to translate movement of that electric actuator to the first and second pressure members during electric actuator operation.

19. A method for controlling movement of a rotatable component, the method comprising:
   disposing pressure members in a substantially coplanar manner relative to a mounting plate which resides in a fixed position relative to the rotatable component;
   in response to a first command, operating electric actuators to move the pressure members relative to the mounting plate from a non-braking position to a braking position to inhibit rotation of the rotatable component; and
   in response to a second command, operating the electric actuators to move the pressure members relative to the mounting plate from the braking position to the non-braking position to allow rotation of the rotatable component;
   wherein disposing the pressure members in the substantially coplanar manner includes:
      receiving sensor signals from electric sensors disposed adjacent the pressure members;
      re-calibrating null positions for the pressure members relative to the mounting plate; and
      moving the pressure members into the re-calibrated null positions for uniform operation of the pressure members.

20. The method of claim 19 wherein the linkage element includes:
   an elongated cantilever beam member having (i) a first end adjacent to a first pressure member, (ii) a second end adjacent to a second pressure member, and (iii) a mid portion disposed between the first and second ends and coupled to one of the electric actuators to translate movement of that electric actuator to the first and second pressure members during electric actuator operation.

* * * * *